Oct. 28, 1958 A. J. KIZAUR ET AL 2,858,445
MECHANICALLY OPERATED SERIALOGRAPHIC APPARATUS
AND EQUIPMENT EMBODYING SAME
Filed March 18, 1953 6 Sheets-Sheet 1

INVENTORS:-
ARTHUR J. KIZAUR
ROBERT J. MUELLER
BY:-
ATTORNEY

Oct. 28, 1958
A. J. KIZAUR ET AL
2,858,445
MECHANICALLY OPERATED SERIALOGRAPHIC APPARATUS
AND EQUIPMENT EMBODYING SAME
Filed March 18, 1953
6 Sheets-Sheet 2

FIG. 6

INVENTORS:-
ARTHUR J. KIZAUR
ROBERT J. MUELLER
BY:-
Junius F. Cook, Jr.
ATTORNEY Oct. 28, 1958

A. J. KIZAUR ET AL 2,858,445

MECHANICALLY OPERATED SERIALOGRAPHIC APPARATUS
AND EQUIPMENT EMBODYING SAME

Filed March 18, 1953

INVENTORS:-
ARTHUR J. KIZAUR
ROBERT J. MUELLER
BY:-

ATTORNEY

Oct. 28, 1958

A. J. KIZAUR ET AL

2,858,445

MECHANICALLY OPERATED SERIALOGRAPHIC APPARATUS
AND EQUIPMENT EMBODYING SAME

Filed March 18, 1953

INVENTORS:-
ARTHUR J. KIZAUR
ROBERT J. MUELLER
BY:-

ATTORNEY

United States Patent Office 2,858,445
Patented Oct. 28, 1958

2,858,445

MECHANICALLY OPERATED SERIALOGRAPHIC APPARATUS AND EQUIPMENT EMBODYING SAME

Arthur J. Kizaur, Pewaukee, and Robert J. Mueller, Milwaukee, Wis., assignors to General Electric Company, a corporation of New York Application March 18, 1953, Serial No. 343,094

22 Claims. (Cl. 250—66)

The present invention relates in general to penetrating ray apparatus, and has more particular reference to mechanism for supporting and shifting ray sensitive sheets or plates for use in producing shadow pictures on ray sensitive screen or film material, as in X-ray photography and fluoroscopy.

An important object of the invention is to provide compact and relatively light-weight apparatus for supporting ray sensitive material, such as X-ray sensitive film, in position for exposure to penetrating rays in the making of photographs; a further object being to provide for shifting the supported material from an inactive, retracted to a projected picturing position; a still further object being to provide for shifting the supported material successively from retracted to a number of predetermined, relatively offset picturing positions, whereby to allow selected portions of the ray sensitive material to be successively exposed in a picturing ray beam; still another object being to provide apparatus readily adjustable to accomplish any selected one of several plate or film shifting cycles.

Another important object is to provide apparatus for progressively shifting a plate, sheet, or film of ray sensitive material successively to a number of predetermined relatively displaced exposure positions forming a plate shifting cycle; a further object being to provide mechanism selectively adjustable to shift a plate or sheet of ray sensitive material through any desired one of a number of different plate shifting cycles.

A further object of the invention is to provide sensitive film or plate shifting apparatus which will accomplish the shifting operation between retracted and projected picturing positions rapidly and substantially without vibration or jar.

Another important object is to provide apparatus of the character mentioned, which is of relatively simple, inexpensive construction and light in weight, whereby the same may be readily supported, as on a diagnostic table, and easily shifted to thereby facilitate the positioning of the apparatus for the making of penetrating ray photographs.

Another important object is to provide mechanism of the character mentioned embodying a screen of material adapted to become luminescent upon exposure to penetrating rays, such as X-rays, whereby to visually examine an object exposed to rays passing therethrough and impinging upon the screen, in combination with ray sensitive film or plate carrying means normally disposed in retracted position outwardly of the zone of said screen, said carrying means being operable at will to project said plate or film into registration with said screen for the purpose of making a penetrating ray photograph of an examination object substantially instantaneously after viewing the same on the screen.

Another object is to provide apparatus for projecting a sheet, layer or plate of sensitive material into position for over-all exposure, or into positions to successively expose each half of the layer, on opposite sides of its center line, or into position successively to expose the several quarter sections of the layer.

Another important object is to provide mechanism for projecting ray sensitive material from retracted to exposure position, comprising a main carriage movable in one direction from retracted position to any selected one of a number of relatively offset projected positions, and an auxiliary carriage adapted to support the sensitive material and movable on the main carriage, during projection thereof, to any one of a number of adjusted positions on the main carriage transversely of the direction of projecting movement thereof.

Another important object is to provide improved mechanical means operable to present a layer of ray sensitive material successively in a plurality of relatively shifted exposure positions, whereby to photograph several related pictures of an examination object upon adjacent portions of the same sensitive layer, sheet, or plate.

Another important object is to provide improved mechanical driving apparatus for successively projecting a sensitive film or plate carrier from retracted to picturing positions, the apparatus being self adjusting to successively present adjacent portions of the film or plate in position for picturing exposure.

Another important object is to provide a simplified, manually adjustable cam mechanism for determining the desired operating cycle of the mechanism; a further object being to employ progressively shiftable cam means for controlling associated mechanism to determine the several projected positions of the film or plate carrier.

Another important object is to provide carriage projecting and retracting mechanism comprising a turnable arm, slip clutch driving means for turning the arm, and selectively operable cam means for determining the displacement of the arm, to thereby accurately determine the projected position of a carriage driven by said arm.

Another important object is to provide carriage shifting mechanism embodying a pair of relatively foldable, pivotally connected links, one of said links being drivingly connected with the carriage remote from its pivotal connection with the other, said other link being drivingly swingable about an axis remote from said pivot connection, said carriage connected link being angularly movable, about its pivotal connection with the other link, as said other link is turnably driven about said axis, including selectively operable means to determine the angular displacement of said links and thus determine the projected position of the carriage; a further object being to provide selectively operable cam control and slip clutch driving means for determining the relative angular displacement of said relatively foldable carriage driving links.

Another important object is to provide carriage driving mechanism of the character mentioned for adjustably projecting a main carriage in one direction, while adjustably shifting an auxiliary carriage on the main carriage in a direction transversely of the projecting movement of the main carriage.

The foregoing and numerous other important objects, advantages and inherent functions of the invention will become apparent as the same is more fully understood from the following description, which, taken in connection with the accompanying drawings, discloses a preferred embodiment of the invention.

Referring to the drawings.

Figures 1, 2, 3, 4, 5, 7:
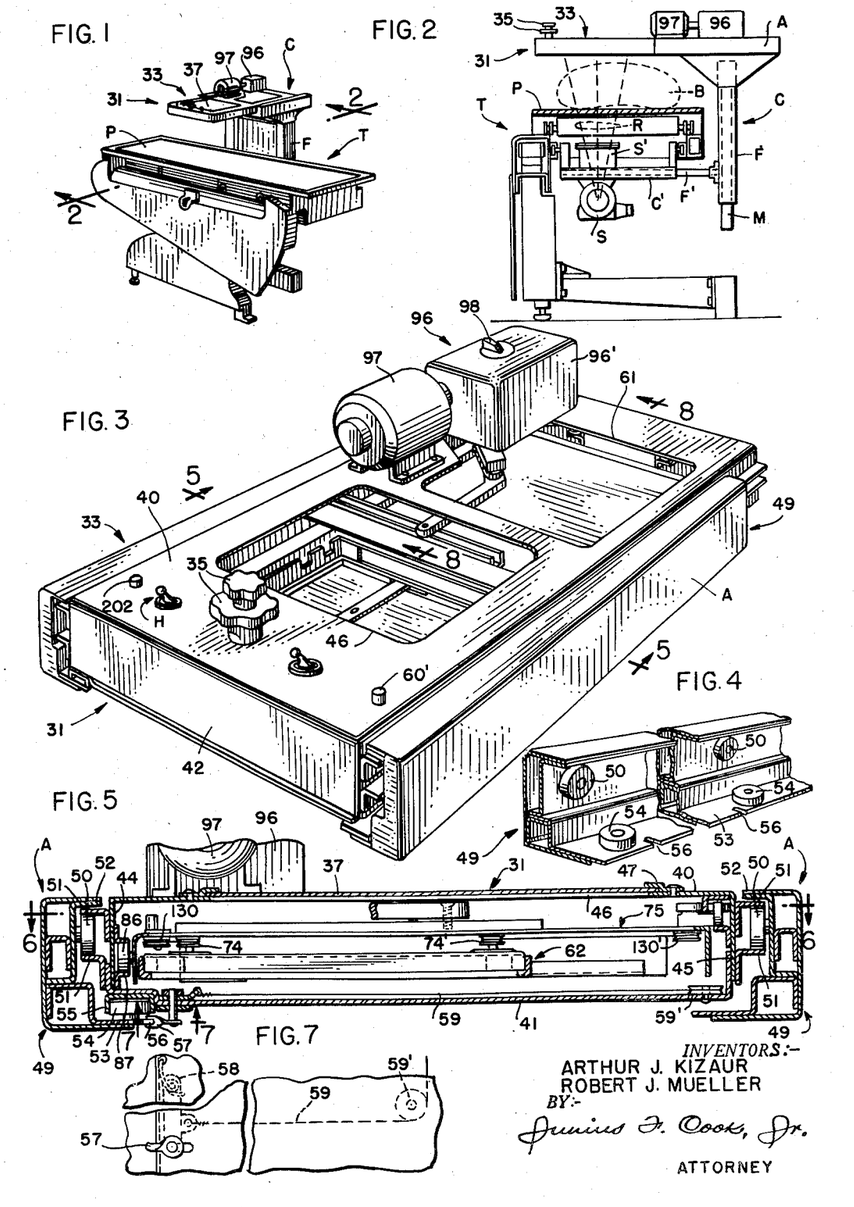
Fig. 1 is a perspective view of X-ray apparatus embodying the present invention.
Fig. 2 is a sectional view along the line 2—2 in Fig. 1.
Fig. 3 is an enlarged perspective view of a portion of the apparatus shown in Fig. 1.
Fig. 4 is a fragmentary perspective view of a portion of the apparatus shown in Fig. 1.
Fig. 5 is a sectional view taken substantially along the line 5—5 of Fig. 3.
Figs. 6 and 7 are sectional views taken substantially along the lines 6—6 and 7—7 in Fig. 5.

To illustrate the invention, the drawings show a table structure T providing a table top panel P for supporting an object or body B to be examined, and carriage means C for supporting a suitable source S of penetrating rays, such as X-rays R, on one side of the panel P, said carriage means serving also to support a frame 31 carrying ray sensitive picturing means 33 on the side of the panel P remote from the source S, whereby penetrating rays R directed, from the ray source, through the panel and an examination object B supported thereon, may excite the sensitive picturing means 33 for the production of shadow pictures therein. As shown, the carriage means C may comprise a frame F disposed alongside of the table structure and having portions F' extending beneath the table top for supporting the ray source S thereunder, said frame portions being preferably mounted in a sub-carriage C' supported in the table structure for adjustment longitudinally of the top panel.

To that end, the frame portions F' may form a mounting for the ray source S which, in the illustrated embodiment, comprises an X-ray generating tube enclosed within a shockproof casing, the casing being secured on the frame portions F' in position such that X-rays, emitted by the tube when electrically energized for ray production, may be directed vertically upwardly toward the top panel P. The frame portions F' may also support a shutter box S' through which the rays R are directed from the source S toward the top panel P, said shutter box being adjustable to control the sectional size and shape of the beam comprising the rays R.

The shutter box S' may comprise material substantially opaque to the penetrating rays R, and may be formed with an open top fitted with suitable shutters defining an aperture through which rays from the source may pass. Preferably, four shutters are employed, two of which are adapted to open and close in a direction longitudinally of the table structure, while the remaining two shutters may open and close in a direction transversely of the table structure, shutter operation being accomplished by suitable mechanism for shifting the laterally and longitudinally adjustable shutters, as by the manual operation of control handles or knobs 35, which may be mounted in convenient position for manipulation, as on the frame 31.

To support the frame 31 in position presenting the picturing means 33 in alinement with rays emitted from the source S, the frame F may extend upwardly of the top panel, at a side thereof, and may comprise a rectangular structure forming preferably roller trackways for supporting a mounting frame M in said trackways, for adjustable movement on the frame F in a direction at right angles with respect to the plane of the table top panel P. The mounting frame M may carry a pair of spaced apart support arms A extending above the top panel P for carrying the frame 31 on and in position extending between said support arms. The carriage structure C is thus movable longitudinally of the table structure from one end thereof to the other, to thereby present the ray source S and the sensitive picturing means 33 in any adjusted position longitudinally of the panel P. The carriage means C is also adjustable laterally of the top panel P, by movement of the frame portions F' in the sub-carriage C', to thereby adjust the ray source and sensitive picturing means in a direction laterally of the panel P.

It will be obvious, of course, that the ray source and the ray sensitive means may be mounted on separate, independently operable carriage structures, and that said source and sensitive means may be mounted on carriage structures supported otherwise than on the table structure, although certain advantages and conveniences result from the mounting of the ray source and the sensitive picturing means upon a common carriage structure and by mounting the carriage means C with the table structure on a common support.

The ray sensitive means 33 may comprise a fluorescent panel or layer 37 adapted to become visibly luminous in response to ray excitation, whereby to provide a visible shadow picture of the object being examined; and the ray sensitive means may additionally comprise ray sensitive sheet material, such as photographic film 38, adapted, upon exposure to penetrating rays from the source S, to receive a latent photographic image of the examination object, such image being susceptible of subsequent development to produce a visible shadow picture of the object in the photographic film.

The present invention contemplates the provision of means substantially instantly operable to selectively present either the fluorescent screen 37 or a ray sensitive sheet or film 38 in position for picture making purposes, at a picturing station, in vertical alinement with the beam of penetrating rays R. To this end, the support frame 31 may comprise a housing of generally elongated rectangular configuration and of hollow, box-like, preferably sheet metal construction embodying top and bottom walls 40 and 41, front and rear end walls 42 and 43, and opposed side walls 44 and 45.

The top wall 40, in the forward portions thereof, may be formed with a preferably rectangular opening 46 for receiving the fluorescent panel 37. This panel may be mounted in said opening in any suitable, preferred or convenient fashion, as by means of a binding frame 47 secured to and around the edges of the panel 37 and fastened to the top wall of the frame, at and around the edges of the opening 46. The lower wall 41 of the frame, opposite the opening 46, may also be formed with an opening, if desired. Such opening may be closed by a panel of material substantially transparent to the penetrating rays R. It is, however, preferable to form the bottom wall of the frame of a thin sheet of metal of uniform thickness, without any opening therein, the material of said bottom wall 41 being substantially transparent to the penetrating rays R. It is also desirable to apply a layer of ray impervious material, such as lead, upon the bottom wall 41 and to form said layer with an opening in registration with the picturing zone defined by the screen 37, to thereby exclude ray penetration within the housing 31 except at said picturing zone.

To mount the housing 31, the arms A may each comprise a light-weight yet rigid bar 49 formed of sheet metal channel elements secured together, as by welding, and provided each with spaced apart rollers 50, the opposite sides 44 and 45 of the housing 31 being provided each with a pair of outwardly projecting flanges 51 extending longitudinally of the housing end and spaced apart to receive the rollers 50 therebetween. The housing may thus be mounted for longitudinal adjustment on the bars 49 in a direction transversely of the table top panel P. If desired, of course, the suspension of the frame 31 on the bars 49 could be accomplished by providing rollers, like the rollers 50, in spaced relation on opposite sides of the housing 31, in position to fit between and rollingly engage track forming flanges, like the flanges 51, formed on the bars 49.

The bars 49 may each include an inturned flange 52 in position to extend substantially in the plane of the top wall 40 of the housing 31, said flanges 52 overlying and enclosing the wheels 50 and the track forming flanges 51, the inner edges of the flanges 52 extending in closely spaced relationship with the opposite longitudinal sides 44 and 45 of the housing. The bars 49 may also include inwardly projecting flanges 53 in position extending beneath the opposite side edges of the housing 31. The flange 53 of at least one of the members 49 may carry spaced rollers 54 in position to rollingly engage track forming means on and extending longitudinally of the housing. Said track forming means may conveniently comprise a channel member, secured on the bottom of the housing 31, at and along one side thereof, said track forming channel member providing a pair of spaced apart dependent flanges 55 in position to engage opposite sides of the rollers 54.

The housing 31 is thus supported for sliding movement longitudinally with respect to the bars 49. As a consequence, the housing 31 may be supported in any one of a number of adjusted positions, including a retracted, inoperative position in which the picturing zone defined by the panel 37 is disposed above the side of the table adjacent the frame F. When in such retracted position, the zone above the table top panel will be substantially unobstructed. The housing 31, however, may be moved on the bars 49 to active or projected position presenting the picturing zone, defined by the panel 37, in vertical alinement with the ray beam R.

Suitable latch means may be provided for securing the housing 31 in retracted and in projected positions. To this end, one of the bars 49 may be formed, as at an edge of its flange portion 53, with spaced latching notches 56 in position to be engaged by a latching detent 57 on and movable with the housing 31 and normally urged, as by means of a spring 58, to press upon the edge of the flange 53 and to latchingly engage the notches 56 when the housing is in retracted and in projected positions. Manually operable means may be provided on the housing, as at the forward portions of the top wall 40 thereof, for retracting the detent 57 when required to release the latch to permit the housing to be moved from retracted to projected position, or vice versa. To that end, a flexible cable 59, guided on a pulley wheel 59', may be provided for connecting the detent with a bell crank lever 60 mounted in the frame 31 at the forward end thereof. A push button member 60' may be mounted in readily accessible position on the housing 31, as at the forward end of its top wall 40, to move the bell crank 60 for release of the detent in response to manual depression of the push button.

The housing 31 thus may be moved in the guiding and supporting channels 49 either to an operable position presenting its picturing zone in alinement with the ray source S, or to a retracted, inactive position out of alinement with said source and on one side of the table structure. The housing 31 may also be adjusted to any desired elevation above the table top panel P by shifting the support structure, including the frame M, on the frame F. Likewise, the frame F may be moved laterally of the table top panel P, within limits determined by the maximum relative movement of the frame portions F', with respect to the sub-carriage C'; and the entire carriage structure C, including the housing 31, may be adjusted longitudinally of the table structure within a range determined by the maximum displacement of the sub-carriage C' longitudinally of the table structure. Accordingly, the picturing zone defined by the panel 37 may be adjusted for operation opposite any selected zone or portion of the table top panel P. It will also be obvious that, by shifting the housing 31 to its retracted position and by moving the frame F on the sub-carriage C' in a direction transversely of the table structure and outwardly of the unobstructed side thereof, the housing 31 and its supporting structure may be moved entirely from above the table top panel P to leave the same entirely unobstructed.

It will be seen from the foregoing that the housing 31 and its supports may be so arranged that when the same is in the projected operating position on the bars 49 and latched in place, the geometrical center of the panel 37 may be disposed in vertical registration with respect to the ray source S, regardless of the lateral and longitudinal adjustment of the carriage means C with respect to the table. As a consequence, by energizing the ray source S in any suitable, preferred or conventional fashion, fluoroscopic examination of any portion of an object supported on the table may be accomplished merely by moving the carriage means C to dispose the ray source and the panel 37 in alinement with such portion of the examination object desired to be viewed on the panel 37.

The housing 31 also contains mechanism for projecting and supporting ray sensitive sheet material, such as photographic film, from a retracted position, at a loading station in the rear portions of the housing 31, into the picturing zone immediately beneath and in registration with the fluorescent panel 37, in order to make ray pictures of the examination object on said film. Such mechanism comprises a cassette carriage 62 adapted to receive and support a cassette of any suitable, preferred or conventional structure, providing a light-tight enclosure for ray sensitive film material. Mechanism is provided for retracting and normally holding the cassette carriage 62 in retracted position opposite a preferably rectangular opening 61, in the top wall 40, of the housing 31, through which opening access to the interior of the housing may be had. When in such retracted position, a cassette may be loaded into or removed from the carriage 62 through the opening 61.

The cassette carriage preferably comprises a lightweight rectangular frame which, if desired, may be formed as a die casting of light-weight metal, such as aluminum; or the frame may comprise formed sheet metal parts. The frame preferably comprises upstanding peripheral walls 63 and inwardly projecting seat forming flanges 64 for receiving the opposite ends of a cassette to support the same in the frame. Ray sensitive film and film cassettes are normally of rectangular shape of somewhat greater length than width, and while the cassette carriage 62 may likewise be of greater length than width to snugly accommodate a conventional cassette, said carriage preferably has square configuration to receive a conventional cassette therein in either one of two positions L and L' extending mutually at right angles, the corners of the carriage being provided with abutments 65 for engaging the opposite sides of a cassette, at the opposite ends thereof, to center the same in the carriage in both of such mounted positions.

The carriage 62 may be provided with spaced rollers 66 on one side thereof. The opposite side of the carriage may be fitted with spaced wheel mounting brackets 67 secured in any suitable or preferred fashion on a wall portion 63 of the frame. As shown, each bracket 67 may comprise a formed sheet metal piece having an attachment flange 68 at one end and adapted to be secured, as by means of fastening screws 69 or by welding, to the carriage 62, and a wheel mounting web 70 adapted to extend outwardly of the carriage wall portion 63 on which the bracket is mounted. A portion 71 of the web 70, remote from the flange 68, may be bent downwardly to form a wheel mounting flange, spaced from the flange 68, said wheel mounting flange 71 carrying a carriage supporting wheel 72 substantially in coaxial alinement with one of the wheels 66 on the opposite side of the carriage. The web 70 may also carry a pair of spaced rollers 73 preferably disposed upon the under side of the web. Each of the brackets 67 may also carry a pulley 74 mounted thereon, preferably on the side of the web 70 opposite from the rollers 73.

The cassette carriage 62, by means of the wheels 66, 72 and 73, may be movably mounted on a carriage frame 75 preferably constructed of sheet metal parts, including members 76 forming the opposite sides of the frame 75 and cross members 77 bracing and interconnecting the opposite ends of the members 76. The members 76 and 77 may be formed from a single plate of sheet metal of rectangular configuration and formed with a central, generally rectangular opening 78 and corner notches 79, the marginal edges of the plate between the corner notches being bent downwardly to provide dependent flanges 76' and 77' on the members 76 and 77. The side and end members 76 and 77 of the carriage frame 75 thus each comprise a pair of integrally united flanges extending mutually at right angles, said dependent flanges 76' and 77' forming a peripheral frame wall. If desired, the flanges 76' and 77' may be rigidly interconnected at the corners of the frame 75, as by means of angle brackets secured to the meeting ends of said flanges.

Roller track means may be formed on the side members 76 of the frame to engage and support the rollers 66, 72 and 73 of the cassette carriage 62 and thus support the cassette carriage on the carriage frame 75. To this end, a track forming channel member 80, providing a pair of spaced flanges 81, may be secured, as by welding, upon the inwardly facing surface of the dependent flange 76' on the carriage frame 75, in position to receive and support the rollers 66 of the cassette carriage. Track forming means may also be secured, as by welding, upon the inwardly facing surface of the flange 76' on the opposite side of the carriage frame, such track forming means, as shown more particularly in Fig. 9, comprising an angle bar providing a flange 82 extending inwardly of the flange 76', and a channel member 83, secured along one side thereof to the flange 76'. The channel member may comprise a bottom wall 84 spaced from the flange 82 sufficiently to receive the rollers 72 of the cassette carriage snugly therebetween. The channel member 83 also forms a web or wall portion 85 in position extending between the spaced rollers 73, said rollers being disposed in position to rollingly engage the opposite sides of said web portion.

The carriage frame 75 may be provided with a pair of spaced rollers 86, preferably disposed at the opposite ends of a frame member 77 at one end of the carriage frame, said rollers 86 being preferably secured on the dependent flange 77' at said end of the frame. The rollers 86 are adapted for rolling engagement in a trackway formed on the inwardly facing surface of the longitudinal side wall 44 of the housing 31, said trackway preferably comprising a channel member 87 secured, as by welding, to the wall 44 and providing spaced flanges projecting inwardly of the wall to rollingly receive the rollers 86 therebetween.

Figures 9, 10, 11, 12, 14:
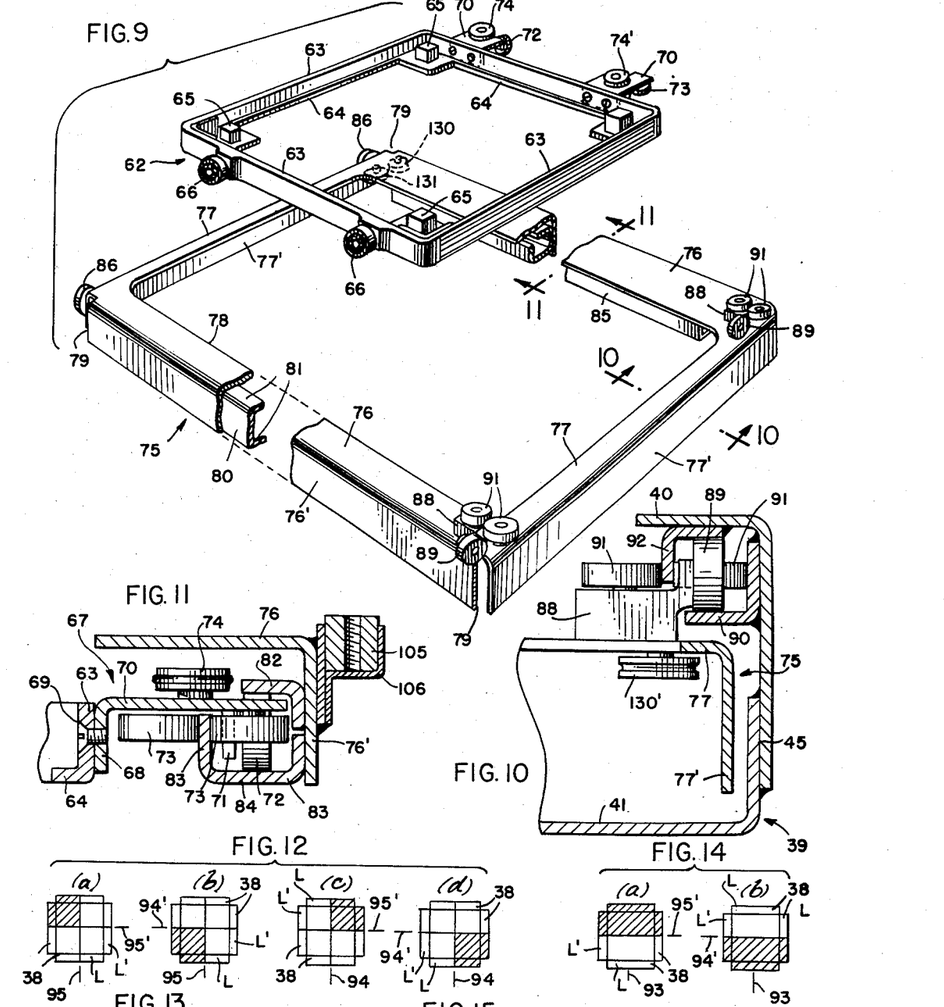
Fig. 9 is a perspective view of carriages forming a part of the mechanism shown in Figs. 3, 5, 6 and 8.
Figs. 10 and 11 are enlarged sectional views respectively taken along the lines 10—10 and 11—11 in Fig. 9.
Figs. 12, 13, 14 and 15 are diagrammatic views illustrating serialographic operation of the mechanism.

The end of the frame 75 remote from the rollers 86, as shown more particularly in Fig. 10 of the drawings, may also carry support rollers for rollingly mounting the carriage frame 75 longitudinally on the housing 31. To this end, roller mounting brackets 88 may be secured on the carriage frame 75 at the opposite ends of its end member 77. Each of said brackets may carry a roller 89 in position to engage track means secured on and extending longitudinally of the housing wall. As shown, such track means may comprise an angle bar secured, as by welding, upon the housing wall and providing a flange 90 extending inwardly of said wall in position, spaced beneath the top wall 40 of the housing, to rollingly receive the wheel 89 between the flange 90 and the top wall of the housing. The bracket 88 may also carry a pair of spaced rollers 91, adjacent the roller wheel 89, in position to engage the opposite sides of a flange or web 92 formed on and dependent from the top wall 40 of the housing, said web 92 extending longitudinally of the housing and preferably comprising one flange of an angle bar, the other flange of which is secured, as by welding, upon the inner or under face of the top wall 40 in position to engage the roller 89.

It will be seen from the foregoing that the cassette carriage structure, including the carriage frames 62 and 75, is movable longitudinally of the housing 31 by action of the rollers 86, 89 and 91, on the track means 87, 90 and 92. It will be seen also that the cassette carriage 62 is movable on the carriage frame 75 by action of the rollers 66, 72 and 73, on the track forming means 80, 82 and 83 in a direction transversely of the longitudinal movement of the carriage frame 75 in the housing 31. By suitably controlling the longitudinal movement of the carriage frame 75, in the housing 31, and the transverse movement of the cassette carriage 62, on the carriage frame 75, any desired portion of a cassette enclosed layer or film of ray sensitive material may be centered in the exposure station. It will also be seen that, by successively adjusting the relatively shifted positions of the frames 62 and 75, various adjacent zones of a ray sensitive cassette enclosed layer may be successively centered for exposure in the exposure zone. Such operation, of course, may be accomplished with a cassette supported in the cassette carriage in either of the two cassette positions L and L'.

Figure 13:
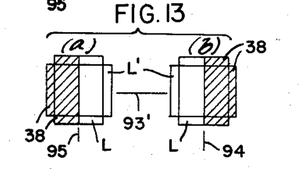

In this connection, the four views, a, b, c and d, shown in Fig. 12, illustrate the successive exposure of the quarter sectional areas of a light sensitive sheet, by disposing such areas successively in centered position in the exposure zone, and by adjusting the relative positions of the carriage frames 62 and 75, respectively, transversely of the carriage frame 75 and longitudinally of the housing 31. The two views a and b of Fig. 13 illustrate the successive exposure of transverse half section areas of a cassette enclosed light sensitive sheet, while the views a and b of Fig. 14 illustrate the successive exposure of longitudinal half section areas of a cassette enclosed light sensitive sheet by appropriate adjustment of the relative positions of the cassette carriage 62 on the carriage frame 75 and of the carriage frame on the housing 31. The exposure of the entire area of a cassette enclosed sensitive sheet when disposed in centered position in the picturing station, in response to appropriate adjustment of the cassette carriage on the carriage frame and of the carriage frame in the housing, is shown in Fig. 15.

Figure 15:
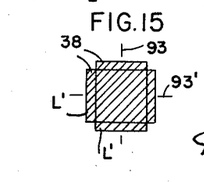

In order to accomplish the several exposure positions of cassette enclosed ray sensitive material shown in Figs. 12–15, means is provided for projecting the carriage frame 75 from retracted position opposite the opening 61 selectively to any one of three projected positions in the picturing zone, including a centered position in the exposure station indicated by the line 93 in Figs. 14 and 15, and offset positions on opposite sides of the central position 93 as illustrated by the lines 94 and 95 in Figs. 12 and 13. Means is also provided for positioning the cassette carriage 62 selectively in any one of three positions of adjustment laterally of the carriage frame 75, including a centered position in the exposure station indicated by the line 93' in Figs. 13 and 15, and offset positions on opposite sides of the central position 93' as illustrated by the lines 94' and 95' in Figs. 12 and 14.

In order to thus shift and stop the carriages 62 and 75 in accurately adjusted positions in the picturing zone, the present invention provides selectively operable actuating mechanism 96 mounted in a suitable frame 96' and driven by a preferably electric motor 97 having a shaft 97' drivingly connected with the mechanism 96, the mechanism 96 being adjustable, as by means of a conveniently located selector knob 98. The mechanism 96 and motor 97 may be supported on the frame 31, as at the rearward portions thereof on one side of the opening 61.

The motor 97 operates in one direction to project the carriage frame 75 from retracted position into the picturing zone, and reverses to return the carriage to retracted or stand-by position. The motor 97 is drivingly connected through the mechanism 96 to turn a shaft 99 in one direction or the other through an angular displacement determined by the adjustment of the selector mechanism 96 by operation of the knob 98. The shaft 99 is connected to control the operation of a folding linkage 100, which in turn is drivingly connected with the carriage frame 75 to project the same from retracted position to any one of the three projected positions 93, 94 or 95, in response to the angular displacement of the shaft 99 under the control of the selector mechanism 96.

To these ends, the linkage 100 may comprise a bar 101 pivotally mounted for turning movement about a shaft or spindle 102, which may be supported on the mechanism frame 96' in position extending within the opening 61. At its end remote from the shaft 102, the bar 101 carries a downwardly projecting axle pin 103, upon which a lever arm 104 is pivotally supported at one end of said arm. The pivot remote end of the arm 104 may be formed for driving connection with the carriage frame 75. To this end, the arm 104 may be fitted with a downwardly extending, preferably cylindrical driving member 105 adapted for sliding reception in a preferably sheet metal trackway 106 secured, as by welding, to a side member 76 of the carriage frame 75.

At its pivotally mounted end, the arm 104 may carry a sprocket wheel 107 fixed thereon for turning movement on the pin 103, said sprocket wheel being drivingly connected, as by means of an endless chain 108, with a sprocket wheel 109 fixed upon the shaft 102. The shaft 102 is also drivingly connected with the motor 97 for turning movement in one direction or the other, both shafts 99 and 102 being drivingly connected with the motor through friction clutch driving devices. The shaft 99 carries a radially extending arm 110 fixed thereon and having a dependent driving pin 111 mounted on the end of the arm 110 remote from the shaft 99. The pin 111 may comprise a roller and may extend in a driving groove or slot 112 formed longitudinally in the bar 101 radially of the shaft 102.

Figure 6:
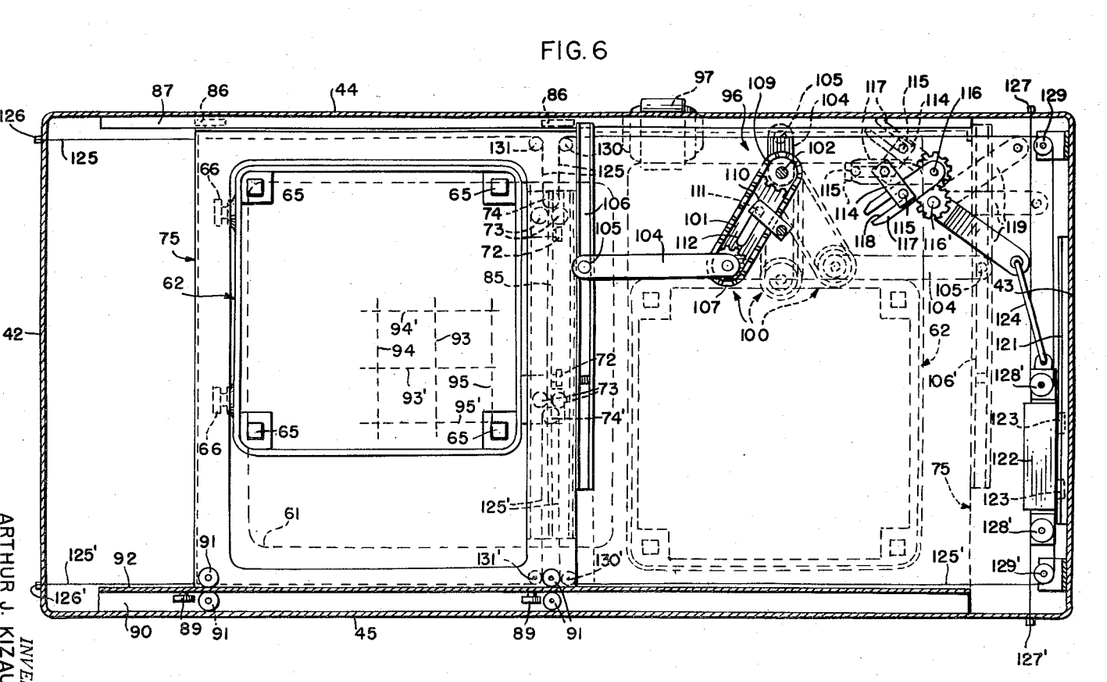
Figure 8:
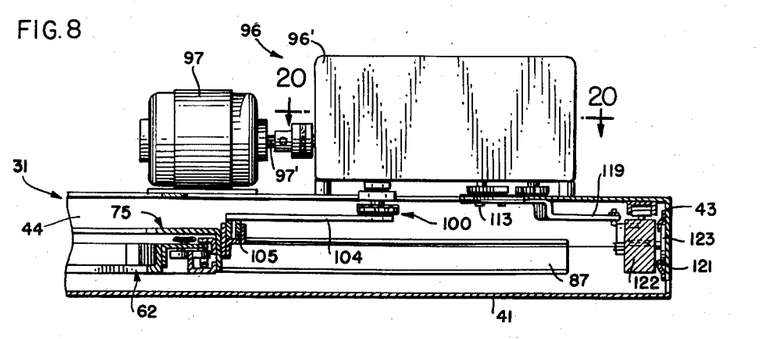
Fig. 8 is a sectional view taken substantially along the line 8—8 in Fig. 3.

By turning the shaft 99 in a clockwise direction viewing Fig. 6, the bar 101 may be moved from a normal or stand-by position, shown in dotted lines, to a fully projected position, shown in solid lines, the arm, during such projecting movement, traversing an angle of the order of 60 degrees about the shaft 102 and passing through an intermediate position, illustrated in dashed lines. During such movement, the driving pin 111 will have traveled from the end of the slot adjacent the shaft 102 to the shaft remote end of the slot and then back to its shaft adjacent end, the pin 111 extending at the shaft remote end of the slot when the arm is in the intermediate position shown in dotted lines.

By turning the shaft 102 in a counter-clockwise direction viewing Fig. 6, the arm 104 may be caused to turn upon the axle pin 103 by action of the driving member 108 and the sprockets 107 and 109, from a retracted position, shown in dotted lines, through an intermediate position, illustrated in dashed lines, to a fully projected position, shown in solid lines. By means of selectively operable stops forming a part of the mechanism 96, the bar 101 during projecting movement thereof may be caused to stop in any desired position, including such positions as will present the carriage frame 75 in the desired projected positions represented by the lines 93, 94 and 95.

The mechanism 96 also provides means for adjusting the cassette carriage 62 on the carriage frame 75. To this end, the mechanism may include a shaft 113 journaled on the frame 96' and projecting downwardly thereof at one side of the opening 61, said shaft being turnable in either direction by the motor 97 through the selectively controllable mechanism 96. Beneath the frame 96' the shaft 113 is provided with a radially extending arm 114 carrying a driving pin 115 at its shaft remote end. The frame 96' carries a pair of spaced, parallel shafts 116, 116' which project beneath the frame in spaced, parallel relation with respect to the shaft 113.

The shaft 116 may carry a radially extending arm 117 supported thereon for turning movement about the axis of the shaft, and formed with a slot or groove 118 therein extending radially of the shaft 116. The shaft 116' may also carry a radially extending arm 119 supported thereon for turning movement about the axis of the shaft 116', the arms 117 and 119 being drivingly interconnected, as by means of intermeshing pinions 120 fixed on said arms and turnable about the axes of the shafts 116 and 116'. The groove 118 slidingly and drivingly receives the pin 115 so that the arms 117 and 119 may be drivingly turned about the axes of the shaft 116 and 116' in response to motor driven rotation of the shaft 113. The arm 119 may thus be driven in a clockwise direction, viewing Fig. 6, from a retracted position shown in dotted lines in Fig. 6, to the fully projected position thereof, as shown in solid lines, through an intermediate position, shown in dashed lines; and the mechanism 96 may incorporate selectively adjustable stop means for holding or stopping movement of the shaft 113, to thereby stop or hold the arm 119 in any desired position within the limits of its travel, including the retracted, intermediate, and projected positions shown in dotted, dashed, and solid lines in Fig. 6.

Means is provided for drivingly connecting the arm 119 with the cassette carriage 62, so that the adjusted position of the cassette carriage may be controlled by the position of the arm 119. To this end, the frame 31 may be provided with roller trackways 121 along its rear end wall 43, and a carriage 122, having rollers 123 for engagement with said trackway, may be mounted for movement transversely of the frame 31. Preferably, the frame 122 comprises a counterweight of mass substantially equal to that of the cassette carirage 62, in order to counterbalance the weight thereof on opposite sides of a medial plane extending longitudinally of the housing 31 at right angles to its top wall 40. The arm 119 remote from the shaft 116' may be drivingly connected with the frame 122, as by means of a preferably rigid connecting rods 124, so that the frame 122 may be drivingly moved on the trackway 121 in response to turning movement of the arm 119 about the axis of the shaft 116'.

The frame 122 is drivingly connected with the cassette carriage 62 by means of flexible cables 125, 125', each having an end secured to the housing 31 by means of cable anchors 126, 126' at the forward end of the housing 31, the opposite ends of the cables 125 and 125' being secured by means of anchors 127, 127' at the rearward end of the housing. The frame 122 is provided with cable pulleys 128 and 128' at the opposite ends thereof, and said cables, respectively, from the anchors 127 and 127' extend around the pulleys 128 and 128', thence around pulleys 129, 129' mounted on the opposite side walls 44 and 45 of the housing 31 adjacent the anchors 127 and 127'. From the pulleys 129 and 129', the cables 125 and 125' extend alongside of and within the housing walls 44 and 45 to and around pulleys 130, 130' mounted at the opposite ends of a side member 76 of the carriage frame 75, and thence around the pulleys 74 and 74' on the cassette carriage. From the pulleys 74 and 74', the cables 125 and 125' pass around pulleys 131 and 131', on the carriage frame 75 in spaced relation with respect to the pulleys 130 and 130', the cables 125 and 125' passing thence alongside of and within the side walls 44 and 45 of the housing 31 to the anchors 126 and 126'.

By virtue of the foregoing arrangement, it will be seen that the cassette carriage 62 will move transversely on the carriage frame 75 in unison with movement of the carriage 122 along the trackway 121, so that the centered or offset relation of the cassette carriage in the picturing zone opposite the opening 46 will be determined by the position of the driving arm 119.

The shaft 102 carries a collar 132 fixed thereon and forming a clutch surface adapted to engage a clutch plate 133, comprising a disk of friction clutch material which encircles the shaft 102 in position engaging the clutch face of the collar. The shaft 102 also carries gear means 134 freely turnable on the shaft and comprising a spur gear 135 and a worm wheel 136 integrated or otherwise fastened together, as by means of a pin 137, for turning movement in unison about the shaft 102, one face of said gear means engaging the friction disk 133 whereby to drivingly connect the gear means with the collar 132 through the friction clutch provided by the disk 133.

A clutch plate 138, similar to the plate 133, encircles the shaft 102 in position to engage the side of the gear means 134 remote from the clutch plate 133, the clutch plate 138 being held in frictional engagement with the gear means 134 by a clutch member 139, comprising a preferably cup-shaped, sheet metal member formed with a flat bottom and peripheral upstanding walls, the flat bottom being formed with a central opening for snugly yet turnably receiving the shaft 102.

Figure 28:
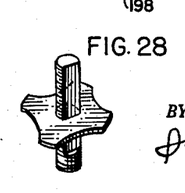
Fig. 28 is a perspective view of an element of the mechanism shown in Figs. 16, 20, 21, and 22.

The shaft 102 may be threaded to receive a holding nut 140 serving to hold the elements 132—139 upon the shaft. To this end, a resilient plate 141 is held on the shaft by the nut 140 and is splined against turning movement on the shaft, as shown in Fig. 28. The plate 141 has spaced apart, radially extending fingers 142 adapted to be received in notches 143 formed in the peripheral walls of the member 139, whereby said member 139 is also secured against turning movement with respect to the shaft 102. The gear means 134 is thus drivingly connected with the shaft through the clutch plates 133 and 138 and the clutch members 132 and 139 which are fast on the shaft; and the frictional driving engagement thus provided may be accurately determined by adjusting the nut 140 on the shaft.

The worm wheel 136 is drivingly connected with a worm gear 144 on the motor shaft 97'. As a consequence, when the motor is started in operation with the folding linkage 100 in the retracted or stand-by position shown in Fig. 6, the arm 104 may be turned in a counterclockwise direction through an angle of the order of 180 degrees. If during such movement the bar 101 remains stationary, such rotation of the arm 104 will move the carriage frame 75 to the projected position indicated by the line 95. If, however, during such turning movement of the arm 104 the bar 101 is permitted to move to the intermediate position shown in dashed lines in Fig. 6, the arm 104 will have projected the carriage frame 75 to the centered position indicated by the line 93. If during such movement of the arm 104 the bar 101 is permitted to move to the projected position shown in solid lines in Fig. 6, the mechanism will have projected the carriage frame 75 to the position indicated by the line 94.

In order to control the bar 101 so that it will either remain in its retracted position, or be projected either to the intermediate or fully projected positions, respectively illustrated in dashed and in solid lines in Fig. 6, the spur gear portion 135 of the gear means 134 is drivingly connected with a gear 145 freely turnable on the shaft 99. The shaft 99 carries fixed thereon a collar 146, similar to the collar 132 on the shaft 102, the collar 146 forming a clutch face for receiving a clutch plate 147, similar to the clutch plates 133 and 138. The clutch plate 147 is disposed between and in facing engagement with one side of the gear 145 which forms a clutch surface and the clutch face of the collar 146. A clutch plate 148, similar to the plate 147, encircles the shaft 99 in position to engage the face of the gear 145 remote from the clutch plate 147, the clutch plate 148 being held in frictional engagement with the gear 145 by disk means 149 secured on the shaft and providing a clutch face in engagement with the surface of the plate 148 which faces away from the gear 145.

The disk means 149 may comprise a pair of latching disks 150 and 151 secured on the shaft 99. The latching disks have circular peripheral edges and each a radially outstanding latching shoulder 152. The latching shoulders of said disks are angularly spaced about the axis of the shaft 99, the angular spacement of the shoulders 152 being equal to the angular movement of the shaft 99 required to drive the bar 101 from its retracted to its intermediate position, shown respectively in dotted and in dashed lines in Fig. 6.

The disks 150 and 151 are yieldingly pressed on the shaft toward the gear 145 by means of a member 153, similar to the member 139, and a resilient plate 154, similar to the plate 141. The plate 154 may have radially extending fingers 155 adapted to engage in slots 156 formed in the peripheral wall of the member 153, the member 153 being preferably splined on the shaft 99 in the manner shown in Fig. 28. If desired, the disks 150 and 151 and the member 153 may be secured together as a unit, as by means of fastening pins 153'.

The shaft 99, like the shaft 102, may be threaded to receive an adjusting nut 157, like the nut 140, said nut 157 serving to hold the plate 154 in resilient engagement with the member 153, and being adjustable on the shaft 99 to determine the frictional connection of the gear 145 with the shaft 99 through the friction clutches 147 and 148. The gear 145, accordingly, is driven by the motor 97 through the spur gear 135, and may in turn drive the shaft 99 through the friction clutches 147 and 148 to an extent allowed by the latching disks 150 and 151.

A pair of selectively operable latching fingers 158 and 159, having lugs 160 in position selectively to engage the disk shoulders 152, are rockingly mounted, as on a pivot pin 161 carried by the frame 96', the fingers 158 and 159 being normally urged on the pivot pin 161, as by means of biasing springs 162, in a direction to press the lugs 160 against the peripheral edges of the latching disks 150 and 151. When the bar 101 is in its retracted position, shown in dotted lines in Fig. 6, the latching lug 160 of the finger 159 will be in latching engagement with the shoulder 152 of the disk 151, in order to prevent rotation of the shaft 99 and hence to hold the bar 101 in its retracted position. By shifting the finger 159 against its biasing spring to a latch releasing position, rotation of the shaft 99 in a clockwise direction, viewing Fig. 6, may be permitted until the latching lug 160 of the finger 158 comes into latching engagement with the shoulder 152 of the disk 150, whereupon further rotation of the shaft 99 will be prevented, as when the bar 101 reaches its intermediate projected position, shown in dashed lines in Fig. 6. If both of the latching fingers 158 and 159 be held in unlatched position outwardly of the latching shoulders 152, the shaft 99 may be turned sufficiently to move the bar 101 to its fully projected position, shown in solid lines in Fig. 6, in which position projecting movement of the bar 101 will be stopped by the engagement of the driving pin 111 in the end of the slot 112 adjacent the shaft 102.

The mechanism 96 also includes transmission means embodying a friction clutch for driving the shaft 113 in order to move the cassette carriage adjusting arm 119 from its retracted position through the intermediate position to the fully projected position thereof, respectively shown in dotted, dashed, and solid lines in Fig. 6. To this end, the spur gear portion 135 of the gear means 134 is drivingly connected with an idler gear 163, suitably journaled on the frame 96'. The idler gear 163, in turn, drivingly engages a gear 164 which is freely turnable on the shaft 113. The shaft 113 carries fixed thereon a collar 165, similar to the collars 132 and 146 on the shafts 102 and 99. The collar 165 forms a clutch face for receiving a clutch plate 166, similar to the clutch plates 133, 138, 147 and 148. The clutch plate 166 is disposed between and in facing engagement with one side of the gear 164 which forms a clutch surface and the clutch face of the collar 165.

A clutch plate 167, similar to the plate 166, encircles the shaft 113 in position to engage the face of the gear 164 remote from the clutch plate 166, the clutch plate 167 being held in frictional engagement with the gear 164 by disk means 168, similar to the disk means 149, secured on the shaft and providing a clutch face in engagement with the surface of the plate 167 which faces away from the gear 164. The disk means 168 may comprise a pair of latching disks 169 and 170 secured on the shaft 113. The latching disks have circular peripheral edges and each a radially outstanding latching shoulder 171. The latching shoulders of said disks are angularly spaced about the axis of the shaft 113, the angular spacement of the shoulders 171 being equal to the angular movement of the shaft 113 required to drive the bar 119 from its retracted to the intermediate position shown, respectively, in dotted and in dashed lines in Fig. 6.

The disks 169 and 170 are yieldingly pressed on the shaft toward the gear 164 by means of a member 172, similar to the members 153 and 139, and a resilient plate 173, similar to the plates 141 and 154. The plate 173 may have radially extending fingers 174 adapted to engage in slots 175 formed in the peripheral wall of the member 172, the member 172 being preferably splined on the shaft 113 in the manner shown in Fig. 28. If desired, the disks 169 and 170 and the member 172 may be secured together as a unit, as by means of fastening pins 172', similar to the pins 153'.

The shaft 113, like the shafts 99 and 102, may be threaded to receive an adjusting nut 176, like the nuts 140 and 157, said nut 176 serving to hold the plate 173 in resilient engagement with the member 172, and being adjustable on the shaft 113 to determine the frictional connection of the gear 164 with the shaft 113 through the friction clutches 166 and 167. The gear 164, accordingly, is driven by the motor 97 through the spur and idler gears 135 and 163, and may in turn drive the shaft 113 through the friction clutches 166 and 167 to an extent allowed by the latching disks 169 and 170.

A pair of selectively operable latching fingers 177 and 178, having lugs 179 in position selectively to engage the disk shoulders 171, are rockingly mounted, as on a pivot pin 180 carried by the frame 96', the fingers 177 and 178 being normally urged on the pivot pin 180, as by means of biasing springs 181, in a direction to press the lugs 179 against the peripheral edges of the latching disks 169 and 170. When the bar 119 is in its retracted position, shown in dotted lines in Fig. 6, the latching lug 179 of the finger 178 will be in latching engagement with the shoulder 171 of the disk 170 in order to prevent rotation of the shaft 113, and hence to hold the bar 119 in its retracted position. By shifting the finger 178 against its biasing spring to a latch releasing position, rotation of the shaft 113 in a counterclockwise direction, viewing Fig. 6, may be permitted until the latching lug 179 of the finger 177 comes into latching engagement with the shoulder 171 of the disk 169, whereupon further rotation of the shaft 113 will be prevented, as when the bar 119 reaches its intermediate projected position, shown in dashed lines in Fig. 6. If both of the latching fingers 177 and 178 be held in unlatched position outwardly of the latching shoulders 171, the shaft 113 may be turned sufficiently to move the bar 119 to its fully projected position, shown in solid lines in Fig. 6, in which position projecting movement of the bar 119 will be stopped by the engagement of the driving pin 115 in the end of the slot 118 adjacent the shaft 116.

When the arms 101, 104 and 119 are in the fully retracted positions shown in dotted lines in Fig. 6, the cassette carriage 52 and the carriage frame 75 will be in retracted positions presenting the cassette carriage, as shown in dotted lines in Fig. 6, opposite the housing opening 61 and in the rearward corner of the housing spaced inwardly and adjacent the end wall 43 and the side wall 44. When in such position, a cassette may be readily loaded into or removed from the cassette carriage through the opening 61.

Selectively adjustable means may be provided for controlling the latching fingers 158, 159, 177 and 178. As shown, such adjustable means may comprise cam disks 182 mounted on a shaft 183 suitably supported in the frame 96', and including disks 184, 185, 186, and 187 in position respectively opposite the latching fingers 159, 158, 178 and 177. These disks may be drivingly interconnected for adjustable turning movement in unison about the axis of the shaft 183 by means of the adjustable handle 98, which is drivingly connected with the disks in any suitable or preferred fashion. As shown, the disks are secured fast on the shaft 183 which is turnably supported on the frame 96', the adjusting handle 98 being likewise fixed on the shaft.

Figures 16, 17, 18:
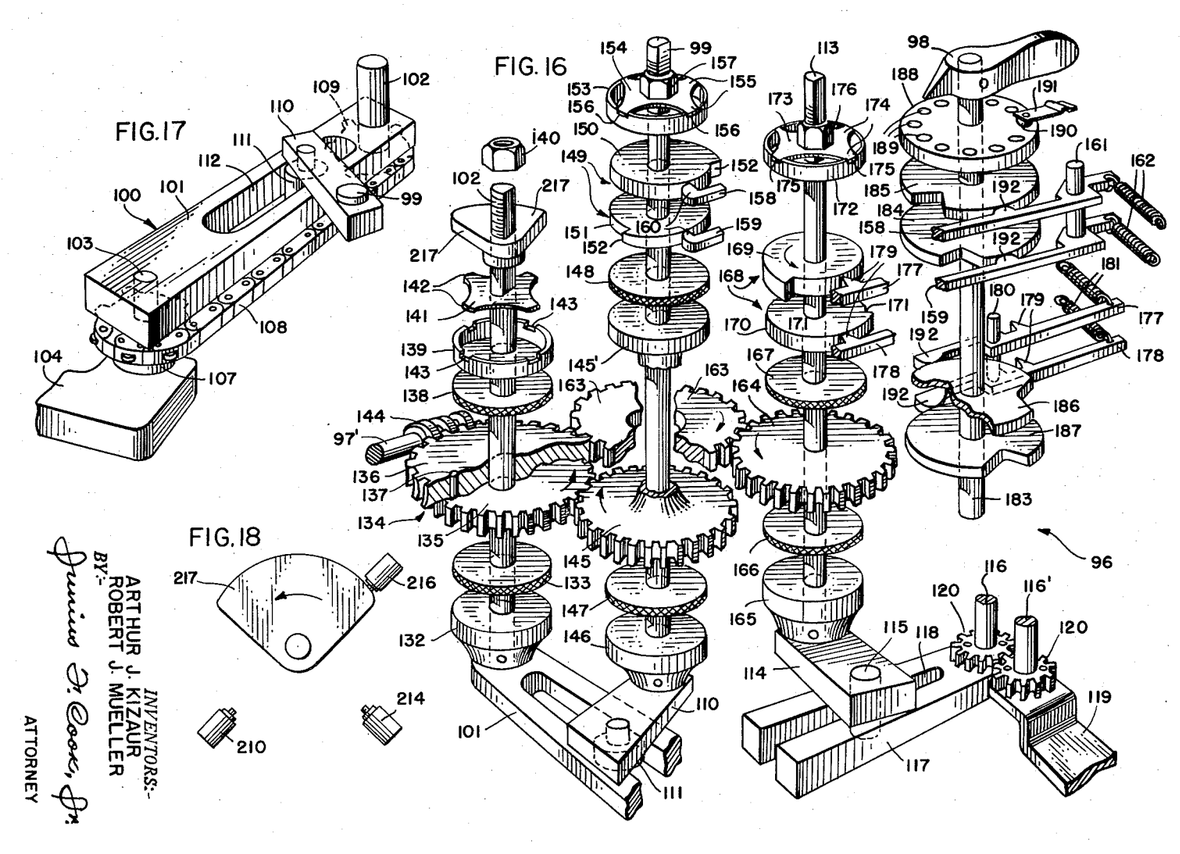
Fig. 16 is an exploded perspective view of selectively operable carriage driving mechanism forming a part of the apparatus.
Figs. 17 and 18 are perspective views of portions of the carriage driving mechanism.

Suitable means may be provided for releasably latching the disks in any one of a plurality of relatively turned positions of adjustment. As shown, such latching means may comprise a latching disk 188 formed with a plurality of circularly spaced apart latching notches or cavities 189, said latching disk 188 being drivingly connected for turning movement with the cam disks 182, as by securing the latching disk 188 on the shaft 183. A spring pressed detent may be provided on the support frame 96' in position selectively to engage the latching notches 189. Said detent, as shown more particularly in Fig. 16, may conveniently comprise a hemispherical element 190 sized for interfitting engagement in the cavities 189 and secured on one end of a leaf spring 191, the other end of which is mounted on the frame 96' so as to resiliently urge the detent 190 into latching engagement with the disk 188 at the cavities 189.

As shown, there are twelve latching cavities 189 defining a corresponding number of relatively shifted positions of adjustment of the cam disks 182. Four successive positions may correspond with the projected carriage positions shown in Fig. 12. The fifth, eighth and eleventh positions may comprise inactive or "dead" settings of the adjustable mechanism. The sixth and seventh positions of adjustment of the cam disks 182 may correspond with the projected carriage positions illustrated in Fig. 13, while the ninth and tenth positions of cam adjustment may represent the projected carriage positions shown in Fig. 14, and the twelfth position of cam adjustment may correspond with the projected carriage position illustrated in Fig. 15.

The disks 182 are of generally circular peripheral configuration for engagement with cam following portions 192 on the fingers 158, 159, 177 and 178, in order to normally hold said fingers in unlatched position clear of the latching shoulders 152 and 171 of the latching disks 149 and 168. The cam disks 182 are provided with edge notches adapted to receive the cam following portions 192 of the latching fingers in order to allow the same, under the influence of the biasing springs 162 and 181, to press inwardly upon the edges of the latching disks 149 and 168 in position to engage with the shoulders 152 and 171 thereof.

To this end, as shown more particularly in Figs. 23–26, the cam disk 184 may be provided with circumferentially spaced edge notches 193 and 194; the disk 185 may be provided with circumferentially spaced edge notches 195 and 196; the disk 186 may be provided with circumferentially spaced edge notches 197, 198 and 199; and the disk 187 may be provided with circumferentially spaced edge notches 200 and 201. The notches are arranged and oriented in the disks 182 so as to control the rotation of the shafts 99 and 113 to accomplish projection of the cassette carriage 52 and of the carriage frame 75, in the manner illustrated in Figs. 12–15, in response to the successive positioning of the selector handle 98 in the several selector positions defined by the latching cavities 189, as follows:

| Selector Position | Carriage Position | Condition of Disk Latches | | | |
|---|---|---|---|---|---|
| | | 159 | 158 | 178 | 177 |
| 1 | Fig. 12 (a) | L | I | L | I |
| 2 | Fig. 12 (b) | L | I | R | R |
| 3 | Fig. 12 (c) | R | R | L | I |
| 4 | Fig. 12 (d) | R | R | R | R |
| 5 | Retracted | | | | |
| 6 | Fig. 13 (a) | L | I | R | L |
| 7 | Fig. 13 (b) | R | R | R | L |
| 8 | Retracted | | | | |
| 9 | Fig. 14 (a) | R | L | L | I |
| 10 | Fig. 14 (b) | R | L | R | R |
| 11 | Retracted | | | | |
| 12 | Fig. 15 | R | L | R | L |

Where L indicates active or latched condition, R indicates latch is released, and I indicated latches 158 and 177 do not operate because latches 159 and 178 are in latched position.

In order to operate the device for the successive exposure of the four quarter sections of a ray sensitive sheet, in the views a, b, c and d of Fig. 12, the shutter means S', by operation of the handles 35, may first be adjusted to confine the ray beam R within an appropriate restricted exposure field centered in the exposure zone defined by the panel 37. Thereupon, the handle 98 may be adjusted to the appropriate initial selector position. The motor 97 may then be set in operation in a direction to move the carriages 52 and 75 to the projected position shown in Fig. 12(a) by operation of a suitable switch having an operating handle H, which switch may be mounted for convenient operation as on the forward portions of the top wall 40 of the housing 31. After the carriages 52 and 75 have been thus projected, the ray source S may be energized, as under the control of a suitable switch 202, to expose the cassette enclosed, light sensitive material supported on the carriage 52.

If desired, of course, suitable control means may be provided for actuating the ray source in response to the arrival of the carriages in projected position, and such control means, if desierd, may be arranged automatically to operate the motor 97 in a direction to move the carriages 52 and 75 to the retracted position upon the completion at the end of an exposure interval, or the control switch may be arranged to control retraction of the carriage means by manual operation of the switch handle H, upon the conclusion of an exposure interval.

If desired, control means may be provided for automatically advancing the selector means upon the arrival of the carriages in retracted position following completion of an exposure of a portion of the sensitive material, as in the positions shown in Figs. 12(a), 12(b), 12(c) and 12(d), or in the positions shown in Figs. 13(a) and 13(b), or in Figs.14(a) and 14(b), in order that the carriages may be then automatically projected to a successive film exposing position following completion of an exposure accomplished in the immediately preceding exposure position.

Such automatic control means, by virtue of the blank or dead selector positions, may be arranged to stop further operation of the mechanism after retraction of the carriage means to standby position following completion of the exposure of the sensitive material in the final exposure position of an exposure series, such as the position d of the series shown in Fig. 12, or the exposure positions b of the series shown in Figs. 13 and 14. Since the entire area of the sensitive cassette mounted layer is adapted to be exposed when the carriages 52 and 75 are in the relatively centered position shown in Fig. 15, it is necessary to remove and replace the cassette at the conclusion of each exposure made with the carriages in the projected position illustrated in Fig. 15. Accordingly, the control means may provide for disabling the mechanism upon movement of the carriage means to retracted position following an exposure accomplished in the Fig. 15 position.

Figure 19:
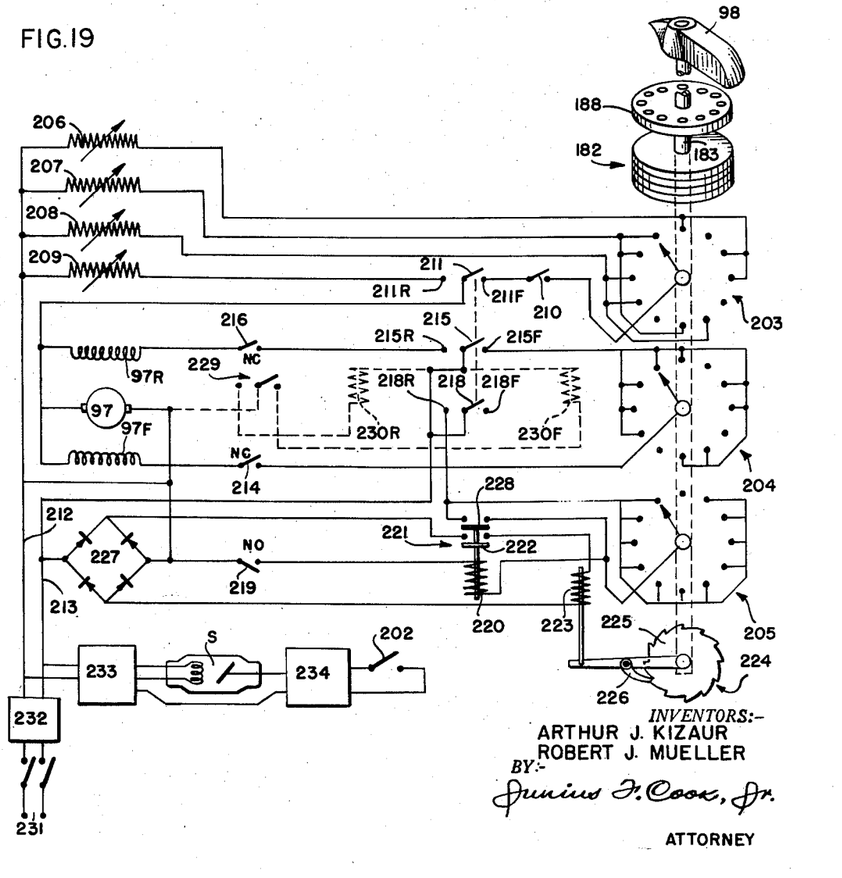
Fig. 19 is a diagrammatic view of control mechanism operable in conjunction with the mechanism shown in Fig. 16.
Figure 20:
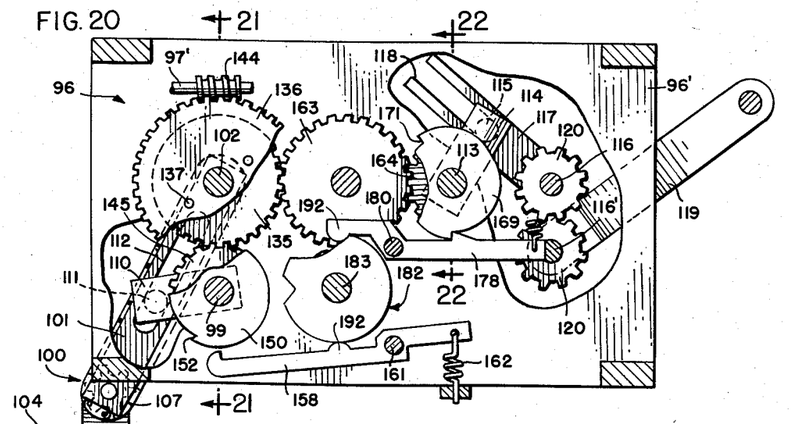
Fig. 20 is a sectional view taken substantially along the line 20—20 in Fig. 8.
Figure 21:
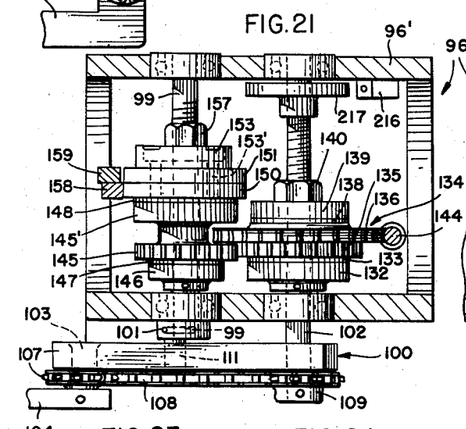
Figs. 21 and 22 are sectional views respectively taken substantially along the lines 21—21 and 22—22 in Fig. 20.
Figure 22:
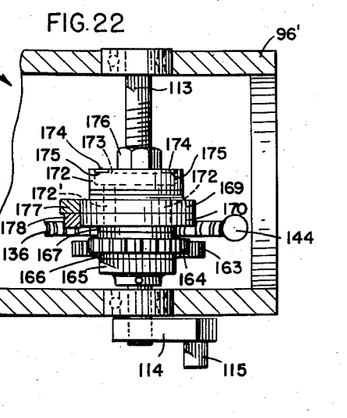
Figure 23:
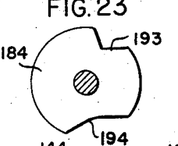
Figs. 23, 24, 25, and 26 are plan views of cam elements employed in the adjustable control mechanism shown in Figs. 16, 20, 21 and 22.
Figure 24:
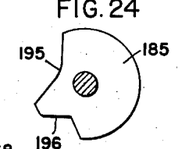
Figure 25:
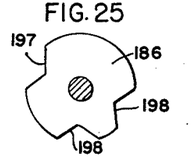
Figure 26:
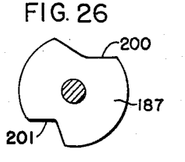
Figure 27:
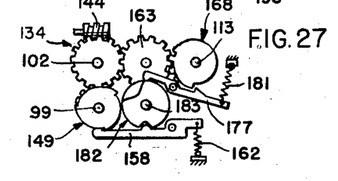
Fig. 27 is a miniature view of the mechanism illustrated in Fig. 20, showing the parts in relatively shifted position.

As shown more particularly in Fig. 19, the means for controlling the operation of the carriage projecting and retracting mechanism may comprise a plurality of selector switches 203, 204 and 205 drivingly connected with the shaft 183 to turn therewith when adjusted by the handle 98. These switches may be electrically interconnected with the motor 97, with motor controlling resistors 206, 207, 208 and 209, and with other switches in order to accomplish the projection and retraction of the carriages 62 and 75 in desired fashion, as in the manner illustrated in Figs. 12–15.

The switches 203, 204 and 205 may comprise twelve position rotary switches, the switch 203 having its first, second and sixth position contacts connected with one side of the resistor 207, its third, fourth and seventh position contacts connected with one side of the resistor 208, its ninth, tenth and twelfth position contacts connected with one side of the resistor 206, and the fifth, eigth and eleventh contacts being dead or disconnected. The movable contact arm of the switch 203 may be connected through a normally open switch 210 with one of the stationary contacts 211F of a double throw, single pole reversing switch 211, the other stationary contact 211R of which is electrically connected with one side of the resistor 209.

The other sides of the resistors 206, 207, 208 and 209, together with one side of the driving motor 97, may be interconnected with one side 212 of a suitable power supply line, the other side 213 of which may be connected through suitable switches with the forward and reverse drive windings 97F and 97R of the motor 97, and, through said windings, with the other side of the motor and with the movable pole of the switch 211. Accordingly, the motor energizing circuit may be completed between the conductors 212 and 213 either through the reverse driving winding or through the forward driving winding; and the motor may selectively be connected in parallel relation with the resistor 209 during reverse driving operation, and in parallel relation with any selected one of the resistors 206, 207 and 208, as determined by the adjustment of the switch 203, during forward driving movement.

To these ends, the selector switch 204 may be interconnected with the power supply line conductors 212 and 213 and with the forward and reverse driving windings 97F and 97R of the motor. As shown, the forward driving winding 97F may be connected through a normally closed switch 214 with the movable contact arm of the selector switch 204, the fifth, eighth and eleventh stationary contacts of which are dead or disconnected. The remaining stationary contacts of the switch 204, namely, the first, second, third, fourth, sixth, seventh, ninth, tenth and twelfth contacts, may be electrically interconnected together and with one of the stationary contacts 215F of a double throw, single pole reversing switch 215, the other stationary contact 215R of which is electrically connected with the reverse driving winding 97R of the motor 97 through a normally closed switch 216, the power line conductor 213 being electrically connected with the movable pole of the switch 215.

Accordingly, when the switches 211 and 215 are moved to the forward driving position with the movable poles thereof in electrical engagement with the stationary contacts 211F and 215F, the switch 214 being closed, the motor 97 will be connected in circuit between the conductors 212 and 213, said circuit extending from the conductor 212 through the motor 97, the forward driving winding 97F, the switch 214, the selector switch 204, and the switch 215; and it will be noted that this circuit will be operative for all positions of the switch 204, except the dead positions represented by the fifth, eighth and eleventh stationary contacts of said selector switch 204. The motor will, of course, remain inoperative whenever the switch 204 is adjusted to any of said dead positions.

It will be noted that the switch 211 in forward driving position, under the control of the switch 210 and the selector switch 203, will determine which of the resistors 206, 207 and 208 shall be interconnected in parallel relationship with the motor 97, to thereby control the operating speed thereof. In this connection, it will be noted that the resistor 206 will be connected when the switch 203 is adjusted to its ninth, tenth and twelfth positions, the same being the positions for accomplishing carriage projection to the positions illustrated in Figs. 14 and 15, such projection involving, in each case, longitudinal movement of the carriage means 75 to its centered position in the picturing zone defined by the panel 37, that is to say, the position in which the carriage 75 is centered on the line 93 in Fig. 6.

The resistor 207 will be connected when the switch 203 is adjusted to its first, second and sixth positions, the same being the positions for accomplishing carriage projection to the positions illustrated in Figs. 12(a), 12(b) and 13(a), such projection involving, in each case, movement of the carriage 75 to a position of minimum projection at the picturing station, that is to say, the position in which the carriage 75 is centered on the line 95 in Fig. 6.

The resistor 208 will be connected when the switch 203 is adjusted to its third, fourth and seventh positions, the same being the positions for accomplishing carriage projection to the positions shown in Figs. 12(c), 12(d) and 13(b), such projection, in each case, involving movement of the carriage 75 to a position of maximum projection at the picturing station, that is to say, the position in which the carriage 75 is centered on the line 94 in Fig. 6.

It will be seen that the resistors 206, 207 and 208 will not be connected in parallel with the motor 97 until after closure of the switch 210, and suitable means is provided for closing said switch 210 after the motor 97 has been in operation during a predetermined interval to project the carriage means from retracted position. To this end, the shaft 99 may be provided with a switch controlling cam 217 fixed on the shaft to turn therewith, said cam being disposed in position to control the operation of the normally open switch 210 and the normally closed switches 214 and 216. The switches 210, 214 and 216 may be suitably mounted on the frame structure 96′ in position such that the normally closed switch 216 will be opened by the cam 217 at the conclusion of reverse carriage retracting travel of the mechanism, and will remain open so long as the carriage means remains in retracted position. The normally closed switch 214 may be mounted in position to be opened by the cam 217 at the conclusion of the forward driving movement of the mechanism, to thereby disable the motor.

The normally open switch 210 may be disposed to be closed by the cam 217 during the forward driving operation of the motor 97 in order to connect one or other of the resistors 206, 207 and 208, whereby to decelerate the motor to a desired extent depending upon the selected projectional displacement of the carriage means, the value of the resistances 206, 207 and 208 being selected to accomplish a desired degree of motor deceleration in the interests of smooth operation.

When the switch 211 is disposed in reverse driving position, it will be seen that the resistor 209 will be interconnected in parallel relationship with respect to the motor 97, thereby determining the rate of motor speed throughout the carriage retracting operation thereof.

Accordingly, to retract the carriage means from projected to standby position it is merely necessary to throw the switches 211 and 215 to the reverse driving position, the switch 216 being at such time in closed position and being opened to disable the motor when the mechanism reaches carriage retracted position. Conversely, to cause projection of the carriage means to a desired projected position, it is merely necessary to appropriately adjust the selector switch means and then to throw the switches 211 and 215 to the forward driving position, the switch 214, at such time, being closed and being opened by action of the cam 217 at the conclusion of the carriage projecting operation of the mechanism.

In order automatically to condition the selector switches to carry out the carriage projecting sequences shown in Figs. 12, 13 and 14 in response to succesisve operation of the switches 211 and 215, means may be provided, in conjunction with and controlled by the selector switch 205, for automatically advancing the selector switches one step to the next succeeding switch position as the carriage means is retracted to standby position following projection to any of the positions shown in Figs. 12, 13 and 14. Such means may also operate to adjust the selector switch mechanism to its inactive fifth, eighth and eleventh positions, respectively, upon retraction of the carriage means from projection to the positions shown in Figs. 12(d), 13(b) and 14(b). As a consequence, the apparatus will be disabled after each projecting sequence has been concluded, that is to say, when the selector switches are in the fifth, eighth and eleventh positions.

In order to accomplish such automatic resetting of the selector mechanism, a single pole, double throw switch 218 may be provided for operation in conjunction with the switches 211 and 215, the switches 211, 215 and 218 being preferably ganged together for operation in unison. The movable pole of the switch 218 may be electrically connected with one side 213 of the power supply circuit. When these switches are moved to the forward driving position, the movable pole of the switch 218 will electrically engage the stationary contact 218F of said switch, said stationary contact being disconnected or dead so that the switch 218 will have no effect upon the automatic operation of the selector switch means during carriage projecting operation of the mechanism. When, however, the switches 211, 215 and 218 are adjusted to the reverse driving position to cause retraction of the carriage means, the movable pole of the switch 218 will electrically engage the stationary contact 218R of said switch.

The contact 218R may be electrically connected with all of the stationary contacts of the switch 205, with the exception of the twelfth contact of said switch. The adjustable contact arm of the switch 205, in turn, may be electrically connected with the other side 212 of the power supply circuit through a normally open control switch 219 and the operating coil 220 of a relay switch 221. Accordingly, when the switches 211, 215 and 218 are in the reverse driving position for carriage retraction, the relay coil 220 may be energized in response to closure of the normally open switch 219, in the event that the selector switch mechanism is adjusted to any position other than the twelfth switch position.

The normally open switch 219 may be mounted in the frame 31 in position to be closed momentarily by the carriage means as the same approaches fully retracted position, to thereby energize the operating coil 220 of the relay switch 221. Such switch operating means, of course, may also momentarily close the switch 219 during projecting movement of the carriage means, but such switch closure during carriage projecting movement will not energize the coil 220 since the coil energizing circuit at such time will be broken at the switch 218 in engagement with the dead stationary contact 218F.

The switch 221 comprises a normally open contact 222 interconnected in series with the operating coil 223 which is drivingly associated with means 224 for turning the selector switch means one step to the next adjacent switch position each time the coil 223 is energized. Any suitable means 224 may be employed for thus turning the selector switch means. As shown, the means 224 may comprise a ratchet wheel 225 drivingly connected with the shaft 183, with which the selector switches 203, 204 and 205 and the latch control disks 184, 185, 186 and 187 and the selector handle 98 are drivingly connected. The ratchet wheel 225 may be operatively associated with a shiftable member carrying a wheel driving pawl 226 and movable when the coil 223 is energized, to cause the pawl 226 to turn the wheel 225 and the connected selector switch means through an angular displacement equal to the angular spacement of the several selector switch positions.

Any suitable means forming a power source may be employed for energizing the coil 223 under the control of the switch 222. As shown, the power supply means may conveniently comprise a rectifier 227, the input side of which is electrically connected with the power supply line conductors 212 and 213, the power supply side of the rectifier being interconnected in series with the switch 222 and the coil 223, whereby the coil may be energized by D. C. power from the A. C. supply line comprising the conductors 212 and 213.

It will be seen from the foregoing that each time the carriage means is retracted from the projected positions illustrated in Figs. 12(a), 12(b), 12(c) and 12(d), 13(a), 13(b), 14(a) and 14(b), the same corresponding with the first, second, third, fourth, sixth, seventh, ninth and tenth positions, the coil 223 will be actuated to advance the selector switch mechanism automatically to the next succeeding switch position.

It will be seen also that, when the switch mechanism is so advanced to the fifth, eighth and eleventh switch positions, respectively, at the conclusions of the carriage projectional sequences shown in Figs. 12, 13 and 14, the switch 204 will be in a dead position inhibiting projection of the carriage means by throwing the switches 211, 215 and 218 to the forward driving position.

It will also be seen that, if the carriage means by chance occupies a projected position when the selector switch means is adjusted to the fifth, eighth or eleventh positions, the carriage means may be retracted merely by moving the switches 211, 215, and 218 to the reverse driving position.

It will be seen also that, when the selector switch means is adjusted to its twelfth position, being the position for accomplishing carriage projection to the projected position shown in Fig. 15, the coil 220 will not be energized during retraction of the carriage means from the projected position shown in Fig. 12, since the twelfth stationary contact of the switch 205 is disconnected and dead. Accordingly, the switch 222 will remain open, the coil 223 will remain de-energized, and the selector switch mechanism will remain unmoved in its twelfth position as the carriage means is retracted following projection to the position shown in Fig. 12.

The relay switch 221 may be provided with a second normally open contact 228 adapted to close when the coil 220 is energized momentarily upon closure of the switch 219 during carriage retracting movement. This switch may be interconnected between the stationary reverse driving contact 218R of the switch 218 and the adjustable contact arm of the switch 205 in order to assure maintenance of the coil energizing circuit through the coil 220 as the switch mechanism is moved from one switch position to the next adjacent position, and particularly when moving from the eleventh to the twelfth switch position.

In this connection, the stationary contacts of the switch 205 may be sufficiently spaced apart so that the coil energizing circuit may be momentarily broken between the stationary and movable contacts of the switch 205, thereby resulting in arcing and destructive deterioration of the switch 205. Since the contact 228 is closed while the moving means 224 is in operation, destructive arcing between the stationary and movable contacts of the switch 205 will accordingly be prevented. The switch 228 also assures that, in moving from the eleventh stationary contact of the switch 205 to the disconnected or dead twelfth contact, the solenoid 220 will remain energized through a time interval sufficient to assure complete switch shifting operation of the apparatus.

The switches 211, 215 and 218 are preferably ganged together for operation in unison, as by means of a common operating handle H, and the switches may be mounted as at the forward end of the frame 31, in position presenting the operating handle H in readily accessible position for operation. If desired, however, the switches 211, 215 and 218 may be mounted in any convenient position and operated under remote control of a single pole, double throw switch 229 mounted on the frame 31, the movable pole of the switch 229 being electrically connected with one of the power supply conductors 212, and the stationary contact elements of the switch 229 being connected with the other power supply conductor 213, respectively through switch actuating solenoids 230F and 230R, operatively associated with the switches 211, 215 and 218 to move the same selectively to forward and reverse driving positions as the switch 229 is operated to selectively energize the solenoids 230F and 230R.

Alternating current power, of course, may be provided from a suitable power supply source 231 through suitable control equipment 232 to energize the supply line comprising the conductors 212 and 213. Power for energizing the X-ray source S may be supplied from the line comprising the conductors 212 and 213 through suitable translation equipment 233, and the operation of the ray source S may be accomplished under control of the switch 202 either directly or by means of suitable timing mechanism 234.

In order to operate the equipment, it is merely necessary to adjust the selector switch mechanism by means of the handle 98 to a desired position, then operate the switch control handle to accomplish carriage projection. After the carriage means has thus been projected to a desired position, the switch 202 may be operated to energize the ray source S in order to expose ray sensitive material supported in the carriage means in the desired exposure position. After conclusion of the exposure, the handle H may be operated to retract the carriage means and automatically to reset the selector switch means, so that by merely actuating the switch handle H the carriage means may again be projected to a desired position for exposure to X-rays in response to actuation of the switch 202.

A complete sequence of the sort illustrated in Figs. 12, 13 or 14 may thus be accomplished, after initial adjustment of the selector switch means, merely by successively operating the switch handle H and the switch button 202, the equipment being automatically disabled at the conclusion of each sequence. At any time, however, the selector switch means may be operated to any desired position, thereby interrupting a sequence then in progress, if such be desirable.

When the selector switch means is set to its twelfth position, operation of the switch handle H will merely cause successive projection and retraction of the carriage means in the Fig. 15 position and will not automatically advance the selector switch means.

It is thought that the invention and its numerous attendant advantages will be fully understood from the foregoing description, and it is obvious that numerous changes may be made in the form, construction and arrangement of the several parts without departing from the spirit or scope of the invention, or sacrificing any of its attendant advantages, the form herein disclosed being a preferred embodiment of the invention for the purpose of illustrating the same.

The invention is hereby claimed as follows:

1. Positioning mechanism comprising frame means forming a work station, carriage means movable on said frame means from a retracted position remote from said station to a selected one of several projected positions at said station, driving means comprising a turnable shaft drivingly connected with said carriage means, motive means for turning the shaft to move the carriage means, slip clutch means connecting the motive means with said shaft, and selectively operable stop means cooperatively associated with said driving means for disabling the same when said carriage means reaches a selected one of a number of relatively shifted positions at said station comprising means forming a plurality of angularly displaced stop shoulders on said shaft, detents corresponding with said shoulders and mounted in position to engage the same respectively when said shaft has turned through corresponding selected angular displacements from a starting position corresponding with the retracted position of said carriage means, and means operable to hold a said detent out of shoulder engaging position.

2. Positioning mechanism comprising frame means forming a work station, carriage means movable longitudinally on said frame means from a retracted position remote from said station to a projected position at said station, a carrier transversely shiftable from retracted to projected position on the carriage means, driving means for so moving the carriage means on said frame means and the carrier on the carriage means, comprising a pair of members drivingly connected respectively with the carriage means and the carrier, said members being movable each in a predetermined path from retracted to projected position and vice versa, power means for so moving said members, including transmission means incorporating a slip clutch coupling interconnecting said power means with each of said members, a stop shoulder formed on each of said members, and detents disposed normally in position to engage each a corresponding one of said shoulders when said members have moved each through a selected angular displacement from a starting position.

3. Positioning mechanism comprising frame means forming a work station, carriage means movable longitudinally on said frame means from a retracted position remote from said station to a selected one of several projected positions at said station, a carrier transversely shiftable from retracted to any one of several projected positions on the carriage means, driving means for so moving the carriage means on said frame means and the carrier on the carriage means, comprising a pair of members drivingly connected respectively with the carriage means and the carrier, said members being movable each in a predetermined path from retracted to projected position and vice versa, power means for so moving said members, including transmission means incorporating a slip clutch coupling interconnecting said power means with each of said members, a plurality of angularly displaced stop shoulders formed on each of said members and corresponding detents normally disposed in position to engage the said shoulders when said members have moved through corresponding angular displacements from starting positions respectively corresponding with the retracted positions of said carriage means on the frame means and the carrier on the carriage means, and selectively operable stop means cooperatively associated with said members for stopping projecting movement thereof when said carriage means and carrier reach selected relatively shifted positions at said station.

4. Positioning mechanism comprising frame means forming a work station, carriage means movable on said frame means from a retracted position remote from said station to a projected position at said station, driving means comprising a turnable shaft drivingly connected with said carriage means, motive means for turning the shaft to move the carriage means, slip clutch means connecting the motive means with said shaft, and stop means cooperatively associated with said driving means for disabling the same when said carriage means reaches a selected one of a number of projected positions at said station comprising means forming a stop shoulder on said shaft, a normally retracted latch member, and selectively operable cam means for disposing said latch member in position to latch said shaft against carriage projecting movement beyond a predetermined limit.

5. Positioning mechanism comprising frame means forming a work station, carriage means movable on said frame means from a retracted position remote from said station to a projected position at said station, driving means comprising a turnable shaft drivingly connected with said carriage means, motive means for turning the shaft to move the carriage means, slip clutch means connecting the motive means with said shaft, and selectively operable stop means cooperatively associated with said driving means for disabling the same when said carriage means reaches a selected one of a number of relatively shifted positions at said station, selectively operable means comprising a plurality of angularly displaced stop shoulders on said shaft, a plurality of normally retracted latch members, and operable means for selectively disposing said latch members each in position to latch a said shoulder against carriage projecting movement of the shaft beyond a corresponding predetermined limit.

6. Positioning mechanism comprising frame means forming a work station, carriage means movable on said frame means from a retracted position remote from said station to a projected position at said station, driving means for so moving the carriage means, comprising a driving arm turnable in one direction about a fixed axis from retracted to projected position and reversely turnable to return the arm to retracted position, power means for so moving said arm, including transmission means incorporating a slip clutch coupling interconnecting said power means with said arm, means drivingly connecting said arm with said carriage means, and means operable to stop turning movement of said arm when the carriage means reaches a predetermined projected position at said station.

7. Positioning mechanism comprising frame means forming a work station, carriage means movable on said frame means from a retracted position remote from said station to a projected position at said station, driving means for so moving the carriage means, comprising a primary driving arm turnable in one direction about a fixed support axis from retracted to projected position and reversely turnable to return the arm to retracted position, power means for so moving said arm, including transmission means incorporating a slip clutch coupling interconnecting said power means with said arm, an auxiliary driving arm pivotally supported for turning movement on said primary arm about a mounting axis spaced from said support axis, said auxiliary arm being drivingly connected with said carriage means, and means for turning said auxiliary arm with respect to said primary arm as the latter is turned on said support axis.

8. Positioning mechanism comprising frame means forming a work station, carriage means movable on said frame means from a retracted position remote from said station to a projected position at said station, driving means for so moving the carriage means, comprising a shaft, a primary driving arm turnable in one direction about said shaft from retracted to projected position and reversely turnable to return the arm to retracted position, power means for so turning said arm on said shaft, an auxiliary driving arm pivotally supported for turning movement on said primary arm about a mounting axis spaced from said shaft, said auxiliary arm being drivingly connected with said carriage means, and means drivingly connecting said auxiliary arm with said shaft whereby to turn the auxiliary arm with respect to said primary arm as the latter is turned on said shaft.

9. Positioning mechanism comprising frame means forming a work station, carriage means movable on said frame means from a retracted position remote from said station to a projected position at said station, driving means for so moving the carriage means, comprising a shaft, a primary driving arm turnable in one direction about said shaft from retracted to projected position and reversely turnable to return the arm to retracted position, transmission means for so turning said arm on said shaft, power means for driving said transmission means and for turning the shaft, an auxiliary driving arm pivotally supported for turning movement on said primary arm about a mounting axis spaced from said shaft, said auxiliary arm being drivingly connected with said carriage means, and means drivingly connecting said auxiliary arm with said shaft whereby to turn said auxiliary arm with respect to said primary arm as the latter is turned on said shaft by said transmission means.

10. Positioning mechanism comprising frame means forming a work station, carriage means movable on said frame means from a retracted position remote from said station to a projected position at said station, driving means for so moving the carriage means, comprising a shaft, a primary driving arm turnable in one direction about said shaft from retracted to projected position and reversely turnable to return the arm to retracted position, transmission means for so turning said arm on said shaft, power means for driving said transmission means and for turning the shaft, an auxiliary driving arm pivotally supported for turning movement on said primary arm about a mounting axis spaced from said shaft, said auxiliary arm being drivingly connected with said carriage means, and means drivingly connecting said auxiliary arm with said shaft whereby to turn said auxiliary arm with respect to said primary arm as the latter is turned on said shaft by said transmission means, said transmission means comprising non-positive driving clutch means.

11. Positioning mechanism comprising frame means forming a work station, carriage means movable on said frame means from a retracted position remote from said station to a projected position at said station, driving means for so moving the carriage means, comprising a shaft, a primary driving arm turnable in one direction about said shaft from retracted to projected position and reversely turnable to return the arm to retracted position, transmission means for so turning said arm on said shaft, power means for driving said transmission means and for turning the shaft, an auxiliary driving arm pivotally supported for turning movement on said primary arm about a mounting axis spaced from said shaft, said auxiliary arm being drivingly connected with said carriage means, and means drivingly connecting said auxiliary arm with said shaft, whereby to turn said auxiliary arm with respect to said primary arm as the latter is turned on said shaft by said transmission means, including non-positive driving clutch means interconnected between said power means and said shaft.

12. Positioning mechanism comprising frame means forming a work station, a carriage frame structure movable on said frame from a retracted position remote from said station to a projected position at said station, a carrier frame structure movable on said carriage frame structure in a direction transversely of carriage movement on said frame, driving means for so moving the carriage frame structure on the frame and said carrier frame structure on the carriage frame structure, including translation means for so moving the carriage frame structure on the frame and transmission means for moving the carrier frame structure on the carriage frame structure, and power means for driving said transmission and translation means, said transmission and translation means each comprising a driven member drivingly connected with its associated frame structure and having a cam slot, a driving shaft having an eccentric driving cam for engagement in said slot, and non-positive clutch means drivingly interconnecting the shaft with said power means.

13. Positioning mechanism comprising frame means forming a work station, a carriage frame structure movable on said frame from a retracted position remote from said station to a projected position at said station, a carrier frame structure movable on said carriage frame structure in a direction transversely of carriage movement on said frame, driving means for so moving the carriage frame structure on the frame and said carrier frame structure on the carriage frame structure, including translation means for so moving the carriage frame structure on the frame and transmission means for moving the carrier frame structure on the carriage frame structure, and power means for driving said transmission and translation means, said transmission and translation means each comprising a driven member drivingly connected with its associated frame structure and having a cam slot, a driving shaft having an eccentric driving cam for engagement in said slot, and non-positive clutch means drivingly interconnecting the shaft with said power means, said slot being formed at one end thereof to lockingly engage with said cam to lock the shaft against turning movement.

14. Positioning mechanism comprising frame means forming a work station, a carriage movable on said frame means from a retracted position remote from said station to a projected position at said station, a carrier adapted to removably receive a ray sensitive material cassette therein, the carrier being movable on said carriage in a direction transversely of carriage movement on said frame means, driving means for so moving the carriage on the frame means and the carrier on the carriage comprising a driven shaft drivingly connected with said carrier for shifting the same on the carriage, driven shaft means drivingly connected with said carriage for moving the same on said frame means, said shaft means comprising a pair of spaced parallel shaft elements respectively forming the one a support and the other a driving element, a radially extending arm turnably mounted on said support element, means drivingly connecting the driving element with said arm to turn the same on said support element, a finger pivotally connected on said arm for turning movement about an axis spaced from said support element, means drivingly connecting said carriage with said finger remote from said axis, means drivingly connecting said finger with said support element, and driving means for turning said support and driving elements and said driven shaft.

15. Positioning mechanism as set forth in claim 14, wherein said finger is connected on said carriage for relative sliding movement transversely of carriage movement on the frame, said finger and support element being drivingly connected by means of a wheel fast on each and a flexible driving member interconnecting said wheels.

16. Positioning mechanism comprising frame means forming a work station, a carriage movable on said frame means from a retracted position remote from said station to a projected position at said station, a carrier adapted to removably receive a ray sensitive material cassette therein, the carrier being movable on said carriage in a direction transversely of carriage movement on said frame means, driving means for so moving the carriage on the frame means and the carrier on the carriage comprising a driven shaft drivingly connected with said carrier for shifting the same on the carriage, driven shaft means drivingly connected with said carriage for moving the same on said frame means, a driving arm mounted for rocking movement about a support axis and drivingly connected with said driven shaft, a frame drivingly connected with said arm remote from said support axis and movable on said frame means transversely of carriage movement thereon, flexible transmission cable means interconnected with said frame means and extending on guide pulleys supported on said frame, the carriage and the carrier for drivingly connecting said frame with the carrier to move the same on the carriage in response to movement of the frame on said frame means, and driving means for turning said shaft and shaft means.

17. Positioning mechanism as set forth in claim 16, wherein the mass of said frame is substantially equal to that of the carrier and a cassette mounted therein, said cable means comprising a pair of cables respectively disposed at the opposite sides of said frame means, each cable engaging a corresponding pulley on the carrier, a pair of pulleys on the carriage, and a pulley on the frame whereby to counterbalance the weight of the carrier on the frame means when loaded with a film cassette.

18. Positioning mechanism comprising frame means forming a work station, carriage means adapted for removably mounting a ray sensitive material cassette, said carriage means being movable on said frame from a retracted cassette loading position remote from said station into position presenting the mounted cassette in any selected one of a plurality of relatively shifted positions at said work station, driving means for so moving the carriage means on the frame, a reversible motor for actuating the driving means, selectively operable stop means for stopping said driving means when the carriage means reaches selected positions of projection at said work station, control means for selectively conditioning said stop means for operation, control switch means for operating said motor in opposite directions, and selectively operable switch means adjustable with said stop means and operatively connected to apply resistance of selected value in the motor circuit to control motor operation in accordance with the selected projected position of the carriage means.

19. Positioning mechanism as set forth in claim 18, including switch means operable during projection of the carriage means to interconnect the selected resistance with said motor.

20. Positioning mechanism as set forth in claim 18, including a reversing resistance of predetermined value and means to connect the same with said motor during operation thereof in reverse.

21. Positioning mechanism as set forth in claim 18, wherein said selectively operable switch means provides a plurality of live positions permitting and a dead position prohibiting operation of said motor.

22. Positioning mechanism as set forth in claim 18, wherein said selectively operable switch means comprises multiple position switching means, and actuating means operable by said carriage means during retracting movement thereof to move the switching means from one position to another.

References Cited in the file of this patent

UNITED STATES PATENTS

| | | |
|---|---|---|
| 2,327,603 | Kizaur | Aug. 24, 1943 |
| 2,552,858 | Mueller | May 15, 1951 |
| 2,622,206 | Passannante | Dec. 16, 1952 |
| 2,668,913 | Goldfield et al. | Feb. 9, 1954 |
| 2,677,517 | Castello | May 4, 1954 |
| 2,709,221 | Haupt et al. | May 24, 1955 |
| 2,749,445 | Stava et al. | June 5, 1956 |